Patented July 25, 1939

2,167,358

UNITED STATES PATENT OFFICE 2,167,358

METHOD OF RECOVERING CONDENSING AGENTS

Anthony H. Gleason, Elizabeth, N. J., assignor to Standard Oil Development Company, a corporation of Delaware No Drawing. Application November 21, 1936, Serial No. 112,073

7 Claims. (Cl. 23—205)

The present invention relates to an improved method of recovering condensing agents particularly of the boron fluoride type.

Recently it has been discovered that boron fluoride is an extremely active halide catalyst and is exceptionally suitable for carrying out certain types of reactions, such as for example the preparation of ethers by reaction of olefines with aliphatic hydroxy compounds, e. g. alcohols, or the preparation of esters by the reaction of olefines with carboxylic acids, particularly low molecular weight fatty acids, the polymerization of olefines, particularly isobutylene, at temperatures below $-10°$ C. to form high molecular weight plastic polymers, the low temperature polymerization of vegetable oils, and the condensation of olefines with aromatics.

However, in most of these reactions the boron fluoride is retained in the final reaction product as a molecular complex and heretofore could only be separated by hydrolyzing this complex with water, caustic soda, or other suitable reagents which hydrolyzed the boron fluoride part of the complex while liberating the main reaction product. In some cases even though the boron fluoride does not form a molecular complex with the reaction product, it has proved difficult to remove all traces of the boron fluoride from the reaction product. Consequently, both owing to the difficulty involved in these processes as well as to the expense involved in the removal of boron fluoride from the reaction products, and most particularly due to the expense of the process due to the loss of boron fluoride (since it is decomposed by the hydrolysis), many of these reactions have not proved quite as practical or economical as it had at first been hoped.

It has now been found that if, after completion of the reactions described above, ammonia is passed into the reaction liquid, it immediately forms the insoluble complex $NH_3.BF_3$ and liberates the desired reaction product. The insoluble complex may be separated from the desired reaction product by any suitable means, such as by settling and separately drawing off the supernatant clear liquid and the sediment, or by filtering, centrifuging, or by distillation. In any of these separation processes if the reaction liquid is too viscous to permit ready separation, it may be diluted with a suitable volatile organic liquid having no hydrolyzing or any other deleterious effect on the $NH_3.BF_3$ complex or on the desired reaction products, such as naphtha, which may readily be removed by distillation. Filter aids may also be used if desired, e. g., charcoal, silica gel infusorial earth. The result is that the desired reaction product is obtained in a substantially pure form, i. e. substantially free from even traces of boron fluoride.

The insoluble residue of $NH_3.BF_3$ may then be treated to recover $BF_3$ by first washing it with a suitable inert volatile organic liquid, such as the volatile diluent referred to above, and then drying. It is then treated with sulfuric acid of about 95 to 100% using about 100-200 parts of weight of sulfuric acid to 100 parts by weight of the $BF_3$ complex and the mixture is gradually heated to about 190 to 210 or 220° C. for a sufficient length of time to cause the evolution of a large proportion of the $BF_3$, leaving a residue which consists chiefly of ammonium bi-sulfate. If it is desired to recover the ammonia from this residue, it may be accomplished by heating with caustic soda or lime which causes a displacement of $NH_3$ which is driven off by heating, thereby leaving the corresponding sodium or calcium sulfate.

It has been known for a long time that ammonia combines with $BF_3$ to form the compound $NH_3.BF_3$, and it is also known that if an alkyl or aryl hydroxy compound is reacted with an amide, such as acetamide, $CH_3CONH_2$, in the presence of $BF_3$, the recommended procedure being to dissolve the $BF_3$ in the amide first and then contacting with the hydroxy compound, the result is the formation of an ester which may be distilled off or filtered off leaving an insoluble precipitate of $NH_3.BF_3$. However, in that case the $NH_2$ group is actually part of one of the chemical compounds entering into the reaction and it was totally unexpected and surprisingly useful to find that in chemical reactions not involving ammonia or amines, but involving the use of boron fluoride as catalyst, this boron fluoride may be recovered in an unexpectedly simple manner by the application of the present invention.

Other catalysts of the $BF_3$ type (i. e., active volatile halid catalysts, which form insoluble compounds with $NH_3$ or amines) include: $AsF_3$, $AsF_5$, $BCl_3$, $SbCl_3$ and $TiCl_4$.

Having thus described the general principles of the present invention, a specific application of it to the process of polymerizing vegetable oils by means of boron fluoride will be explained. In this process boron fluoride is mixed to the extent of 3 to 20% or more with the vegetable or other fatty oil which it is desired to polymerize.

It should be noted here that if the boron fluoride cannot be recovered after the polymerization of the oils is accomplished, the cost of polymerizing fatty oils by this process is almost prohibitive.

It may be recovered almost quantitatively by simply heating the reaction mixture of the complex formed together with a solvent to a temperature of 120 to 130° C. with agitation, but the quality of the polymerized oil is impaired and additional operations are required to improve the color and reduce the acidity of the oil caused by the heating. This is a serious handicap because one of the chief advantages of the use of boron fluoride over other less active catalysts is that it enables polymerization to be carried out at very low temperatures, e. g., below 100° C. or preferably at room temperature or below, and may be as low as −50° or 100° C.

According to the present invention the necessity of heating the oil to recover the boron fluoride may be avoided and the light color and low acidity of the polymerized oil may be preserved, namely by adding gaseous ammonia to the reaction mixture until the boron fluoride is completely precipitated as $NH_3.BF_3$.

In one example after the precipitated complex $NH_3.BF_3$ was removed by filtration and then washed with naphtha and dried, 85 parts by weight of dried residue were treated with 100 parts by weight of 95% sulfuric acid and the mixture was heated gradually to 190 or 200° C. This caused the evolution of boron fluoride to the extent of about 75% of the theoretical quantity.

In another example, 40 parts by weight of a similar dried residue of $NH_3.BF_3$ were treated with 90 parts by weight of 100% sulfuric acid and the mixture was heated to a somewhat higher temperature, i. e., about 240° C., and in this case a recovery yield of 80–85% of boron fluoride was obtained.

Although amines or other organic compounds containing trivalent nitrogen could be used in place of ammonia, such as aniline, pyridine, diethylamine, isopropyl amine, or other alkyl amines, it is preferable to use ammonia because of its low molecular weight, the complete insolubility of the complex $NH_3.BF_3$ in organic solvents and its inertness to sulfuric acid at high temperatures.

Although the invention is primarily intended as a means of recovering boron fluoride without decomposing it and therefore is intended primarily to be used instead of the hydrolysis by water, alcohol or caustic soda as has been used heretofore, still the invention may be used to supplement such an hydrolysis step. For example, under circumstances where the boron fluoride is relatively cheap, it may be more economical to simply hydrolyze the reaction mass with one of the hydrolyzing agents mentioned and then after separation of the sludge layer containing the hydrolyzed boron fluoride, the desired reaction product now substantially free from boron fluoride but perhaps still containing minute traces of it is then subjected to a treatment with ammonia which is found to precipitate even the slightest trace of $BF_3$, thereby forming a corresponding amount of insoluble complex $NH_3.BF_3$ which may be removed by filtration or any other suitable means such as those mentioned above.

The invention may also be applied to the recovery of unreacted boron fluoride in the gases issuing from the reaction chamber. This may be accomplished in any suitable manner such as by feeding into the mixed gases a small amount of ammonia or other volatile amine and then recovering the resultant finely divided solid $NH_3.BF_3$ complex in a chamber where the velocity of the gases is reduced as in many types of dust collecting equipment, or the complex may be recovered by scrubbing it out from the mixed gases by a suitable scrubbing liquid which may be a light hydrocarbon liquid such as naphtha or gas oil or any other suitable inert liquid in which the complex is preferably insoluble. The complex may be recovered by sedimentation, filtration, etc. If desired the mixed gases containing boron fluoride or equivalent catalyst may be scrubbed directly with a liquid or liquified amine capable of forming a non-volatile complex with the $BF_3$ type catalyst.

It is not intended that the invention be limited to any theories as to the operation of the invention nor to any of the specific examples which have been given merely for the sake of illustration, but only by the appended claims in which it is intended to claim all novelty inherent in the invention as broadly as the prior art permits.

I claim:

1. The process of recovering a boron fluoride catalyst from reaction liquids containing same, either dissolved therein or held therein in the form of a chemical complex of the reaction product, which comprises contacting said reaction liquid with a trivalent nitrogen compound capable of reacting with said catalyst to form a chemical complex which is insoluble in the reaction liquid and precipitates out therefrom, and separating the precipitated complex from the reaction liquid.

2. The process of recovering a volatile halide catalyst of the group consisting of $BF_3$, $AsF_3$, $AsF_5$, $BCl_3$, $SbCl_3$, and $TiCl_4$, from reaction liquids containing same, either dissolved therein or held therein in the form of a chemical complex with the reaction product, which comprises contacting said reaction liquid with a trivalent nitrogen compound capable of reacting with said catalyst to form a chemical complex which is insoluble in the reaction liquid and precipitates out therefrom, and separating the preciptated complex from the reaction liquid.

3. The process of recovering a boron fluoride catalyst from mixed reaction gases containing same, which comprises contacting said gases with ammonia, and separating the resultant non-volatile $NH_3.BF_3$ complex from the residual gases.

4. Process according to claim 2 in which the nitrogen compound used is a member of the group consisting of ammonia and trivalent nitrogen derivatives of hydrocarbons.

5. Process of recovering boron fluoride catalyst from reaction liquids after completion of the reaction which comprises contacting said reaction liquid with substantially anhydrous ammonia, and separating the resultant insoluble $NH_3.BF_3$ complex from the remainder of the reaction liquid.

6. Process according to claim 5 as applied to the recovery of boron fluoride from chemical reactions of the class consisting of the polymerization of unsaturated hydrocarbons, the treatment of mineral and vegetable oils, the condensation of unsaturated aliphatic hydrocarbons with aromatic hydrocarbons, and the reaction of olefines with aliphatic oxygen-containing organic compounds containing an active hydrogen, such as alcohols, fatty acids, and the like.

7. Process according to claim 5 in which the recovered $NH_3.BF_3$ complex is treated with concentrated sulfuric acid at elevated temperature to drive off a major proportion of the $BF_3$ from said complex, and recovering the boron fluoride thus liberated.

ANTHONY H. GLEASON.